US011873769B2

(12) United States Patent
Iga et al.

(10) Patent No.: US 11,873,769 B2
(45) Date of Patent: Jan. 16, 2024

(54) ENGINE-EQUIPPED VEHICLE

(71) Applicant: KUBOTA Corporation, Osaka (JP)

(72) Inventors: Michisuke Iga, Sakai (JP); Masaharu Ono, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/541,911

(22) Filed: Dec. 3, 2021

(65) Prior Publication Data

US 2022/0205400 A1 Jun. 30, 2022

(30) Foreign Application Priority Data

Dec. 31, 2020 (JP) ................................ 2020-219958

(51) Int. Cl.
*F02D 41/00* (2006.01)
*F02D 13/06* (2006.01)
(Continued)

(52) U.S. Cl.
CPC ......... *F02D 41/0087* (2013.01); *F02D 13/06* (2013.01); *F02D 41/1498* (2013.01); *F02N 11/0848* (2013.01); *F02P 5/151* (2013.01); *F02P 5/1504* (2013.01); *F02P 5/1506* (2013.01); *F02P 5/1522* (2013.01);
(Continued)

(58) Field of Classification Search
CPC .. F02D 41/0087; F02D 13/06; F02D 41/1498; F02D 17/02; F02D 41/065; F02D 41/06; F02D 41/062; F02D 41/064; F02D 41/222; F02D 2200/0414; F02D 2200/021;
(Continued)

(56) References Cited

U.S. PATENT DOCUMENTS 4,157,084 A * 6/1979 Wallis .................. F02N 19/001 123/474
4,494,502 A * 1/1985 Endo ....................... F02M 3/07 123/580
(Continued)

FOREIGN PATENT DOCUMENTS

JP 09042038 A * 2/1997
JP 2002201997 A * 7/2002 .......... F02D 19/061
(Continued)

OTHER PUBLICATIONS

Office Action dated Aug. 23, 2023 in JP Application No. 2020-219958 (with English Translation).

*Primary Examiner* — Sizo B Vilakazi
*Assistant Examiner* — Brian R Kirby
(74) *Attorney, Agent, or Firm* — Panitch Schwarze Belsiario & Nadel LLP

(57) ABSTRACT

An engine-equipped vehicle capable of preventing gear noise and gear wear when the engine is started is provided. A multicylinder engine, a gear transmission that shifts power from the multicylinder engine by a shift operation, a centrifugal clutch arranged in a power transmission path from the multicylinder engine to the gear transmission, and an electronic control device that controls an operation of the multicylinder engine are included and the engine is configured to be started with a partial cylinder operation start where under control of the electronic control device, only some cylinders are operated and an operation of other cylinders is stopped.

21 Claims, 3 Drawing Sheets

(51) Int. Cl.
*F02P 5/152* (2006.01)
*F02P 5/15* (2006.01)
*F02D 41/14* (2006.01)
*F02N 11/08* (2006.01)

(52) U.S. Cl.
CPC .... *F02D 2250/21* (2013.01); *F02N 2200/023* (2013.01); *F02N 2200/024* (2013.01); *F02N 2300/2002* (2013.01)

(58) Field of Classification Search
CPC .... F02D 41/06; F02D 41/008; F02D 41/0225; F02D 41/22; F02P 5/045; F02N 11/0803
USPC .......... 123/198 D, 688, 491, 179.3; 701/113, 701/107
See application file for complete search history.

(56) References Cited

U.S. PATENT DOCUMENTS 4,844,039 A * 7/1989 Osaki .................... F02D 41/061 123/480
4,887,476 A * 12/1989 Yokoyama ............. F02B 75/16 74/7 E
5,083,545 A * 1/1992 Yamashita ............ F02M 39/00 123/373
5,690,073 A * 11/1997 Fuwa .................. F02D 41/0087 123/481
5,992,355 A * 11/1999 Shichinohe ............. F02B 61/02 123/195 AC
6,158,218 A * 12/2000 Herold .................... F02D 17/02 60/609
6,257,207 B1 * 7/2001 Inui ..................... F02D 41/0087 123/480
6,283,092 B1 * 9/2001 Jung ........................ F01P 11/16 374/1
6,341,659 B1 * 1/2002 Ibukuro .................. F02B 61/02 180/230
6,389,806 B1 * 5/2002 Glugla ................ F02D 41/1443 60/284
6,520,158 B1 * 2/2003 Mills ................... F02D 41/3827 123/481
6,843,225 B1 * 1/2005 Ise .......................... F02P 15/08 123/339.11
6,857,264 B2 * 2/2005 Ament ................ F02D 41/0245 60/284
6,922,986 B2 * 8/2005 Rozario .............. F02D 41/0087 60/284
7,044,107 B1 * 5/2006 Duty ........................ F02D 13/06 123/196 R
7,890,244 B2 * 2/2011 Nishimura ................ F01L 1/34 123/316
8,423,251 B2 * 4/2013 Hartmann .............. B60W 10/11 701/99
8,899,211 B2 * 12/2014 Aso ....................... F02D 41/047 123/179.18
9,511,761 B2 * 12/2016 Yagyu ................... B60W 10/04
2003/0089330 A1 * 5/2003 Azuma ............... F02D 41/0087 123/198 F
2004/0040550 A1 * 3/2004 Someno .............. F02D 41/3094 123/549
2004/0235615 A1 * 11/2004 Deguchi .................. B62M 9/04 477/43
2005/0178130 A1 * 8/2005 Van Gilder .............. F01P 11/16 374/E15.001
2007/0074593 A1 * 4/2007 Mizuno ................... F16H 3/006 74/330
2007/0199392 A1 * 8/2007 Mizuno ..................... F16H 3/30 74/325
2008/0004158 A1 * 1/2008 Carl .................... F02D 41/0087 477/107
2008/0041327 A1 * 2/2008 Lewis ................... F02N 19/004 123/179.3
2008/0281506 A1 * 11/2008 Washio ............... F02N 11/0848 701/113
2009/0194057 A1 * 8/2009 Kapinsky .................. F02N 5/02 123/185.3
2010/0222989 A1 * 9/2010 Nishimura ............ F02D 41/062 123/90.15
2010/0307458 A1 * 12/2010 Asai .................... F02D 41/3827 123/491
2013/0058373 A1 * 3/2013 Sakurada .............. F02D 41/222 374/4
2014/0113766 A1 * 4/2014 Yagyu ................... B60W 10/04 903/902
2017/0254280 A1 * 9/2017 Honjo .................... B60W 10/11
2018/0142586 A1 * 5/2018 Uezu ......................... F01M 1/02
2020/0040863 A1 * 2/2020 Klatt ..................... F02D 41/062

FOREIGN PATENT DOCUMENTS

JP 2004308628 A 11/2004
JP 2010151124 A 7/2010
JP 2013112149 A * 6/2013
JP 2017-155698 A 9/2017
JP 2018155164 A 10/2018

* cited by examiner

ENGINE-EQUIPPED VEHICLE

CROSS-REFERENCE TO RELATED APPLICATIONS

This application claims priority under 35 U.S.C. § 119(b) to Japanese Application No. 2020-219958, filed Dec. 31, 2020, the disclosure of which is incorporated herein by reference.

BACKGROUND OF THE INVENTION

(1) Field of the Invention

The present invention relates to an engine-equipped vehicle.

(2) Description of Related Art

In a conventional engine, the engine rotation speed suddenly rises when the engine is started, and sometimes exceeds the clutch engagement rotation speed of the centrifugal clutch. In this case, when the gear transmission is put from the neutral position into the transmission operation position by the shift operation, a situation occurs in which the drive side of the transmission gear is moving but the driven side is stopped in the gear transmission, the gear is not engaged smoothly, and gear noise and gear wear may occur.

SUMMARY OF THE INVENTION

An object of the present invention is to provide an engine-equipped vehicle capable of preventing gear noise and gear wear when the engine is started.

The main configuration of the invention of the present application is as follows.

An engine-equipped vehicle including a multicylinder engine (1), a gear transmission (2), a centrifugal clutch (4), and an electronic control device (5), in which the engine-equipped vehicle is configured so that the engine is started with a partial cylinder operation start (S6) where under control of the electronic control device (5), only some cylinders (#1) are operated and an operation of other cylinders (#2) is stopped.

Specific examples can include a two-cylinder engine as the multicylinder engine, a cylinder on an output side as the some cylinders (#1), and a cylinder on an opposite side of the cylinder on the output side as the other cylinders (#2).

In this engine-equipped vehicle, low-torque engine start with the partial cylinder operation start makes it difficult for the engine rotation speed to exceed the clutch engagement rotation speed of the centrifugal clutch, and even when the gear transmission is put from the neutral position into the transmission operation position by a shift operation, the gear is engaged smoothly, and gear noise and gear wear can be prevented.

DETAILED DESCRIPTION OF PREFERRED EMBODIMENTS

Figure 1:
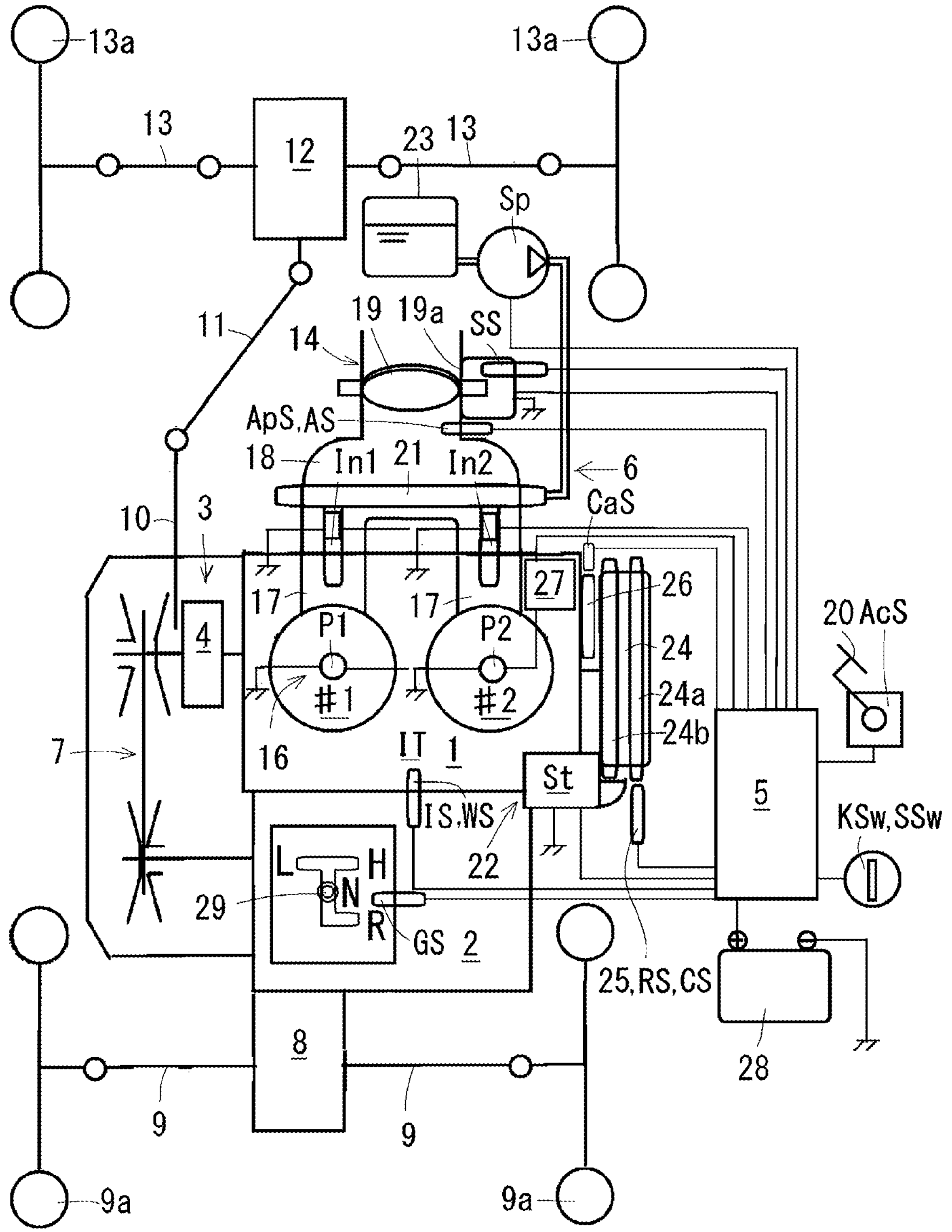
FIG. 1 is a schematic view of an engine-equipped vehicle according to an embodiment of the present invention.
Figure 2:
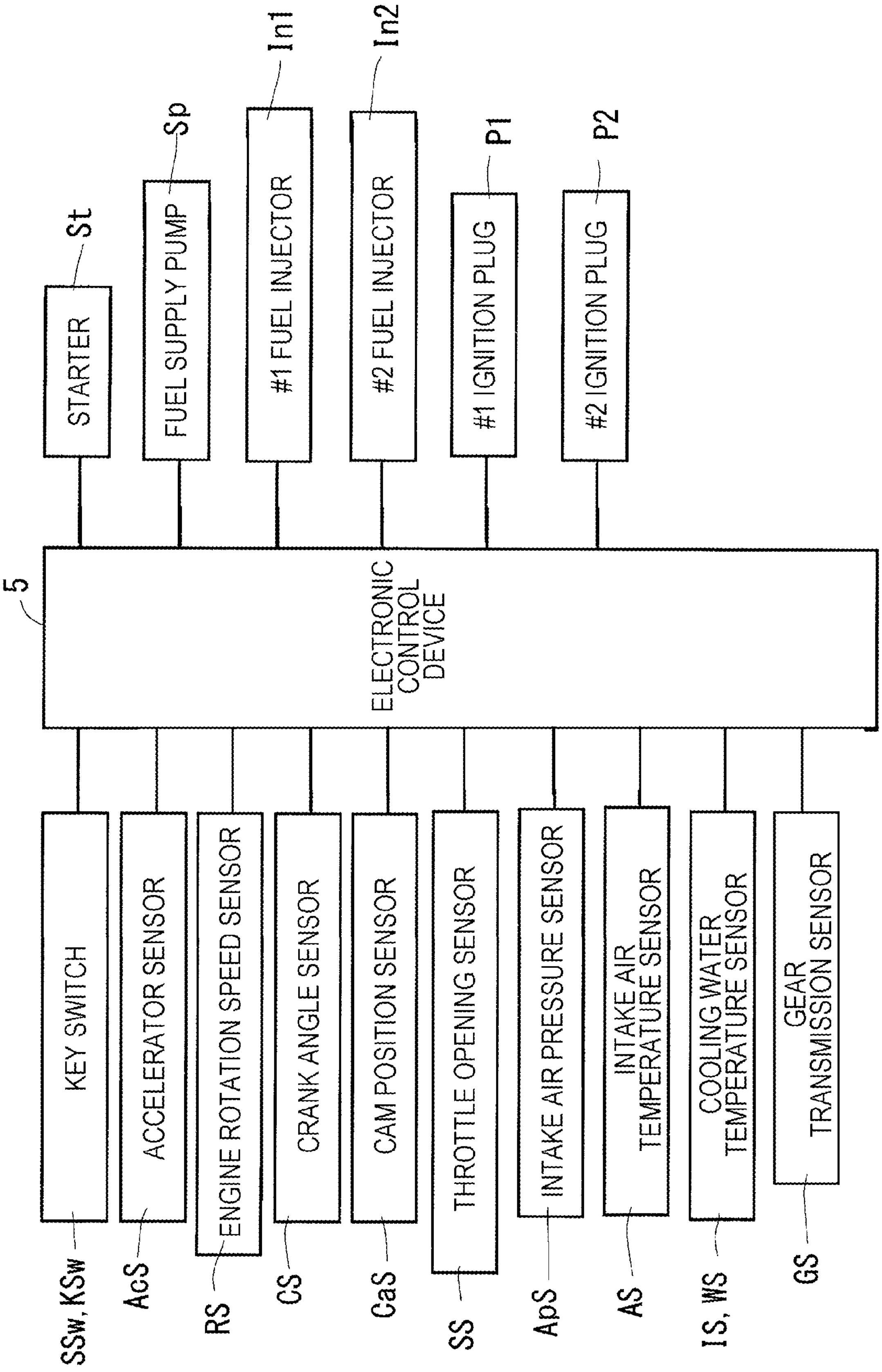
FIG. 2 is a view showing connection among a sensor, an electronic control device, and an actuator that are used in the engine-equipped vehicle of FIG. 1.
Figure 3:
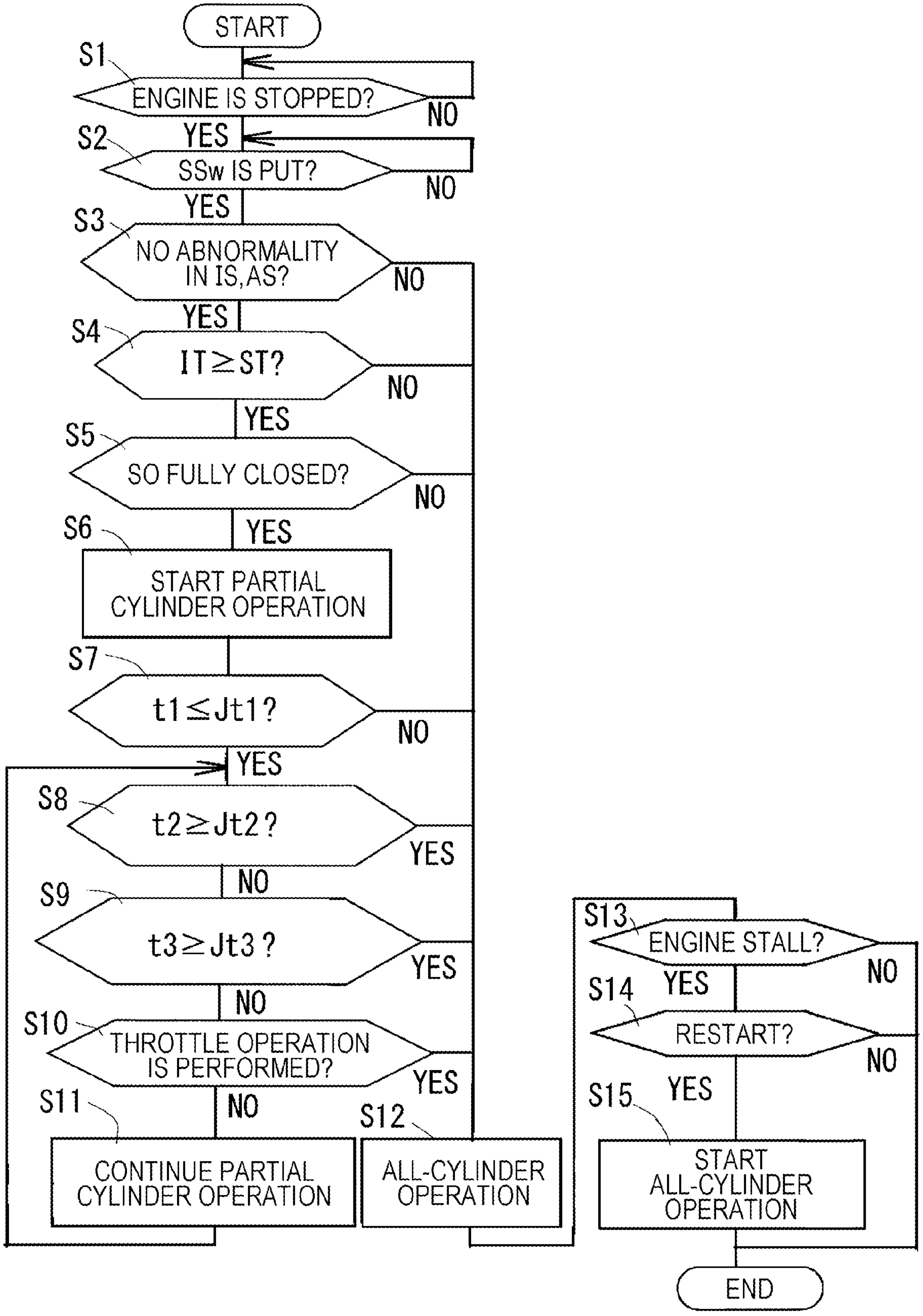
FIG. 3 is a flowchart of the control by the electronic control device of the engine-equipped vehicle of FIG. 1.

FIGS. 1 to 3 are views for explaining an engine-equipped vehicle according to an embodiment of the present invention. In this embodiment, a multipurpose vehicle equipped with a multicylinder engine will be described.

As shown in FIG. 1, this multipurpose vehicle includes a multicylinder engine (1) and a power transmission path (3) that transmits power from the multicylinder engine (1), and includes, in the power transmission path (3) from a transmission upper side, a centrifugal clutch (4), a belt-type continuously variable transmission (7), a gear transmission (2), a rear-wheel differential mechanism (8), a pair of left and right rear axles (9) (9), a power takeoff shaft (10), a propulsion shaft (11), a front-wheel differential mechanism (12), and a pair of left and right front axles (13) (13).

This multipurpose vehicle is configured as a four-wheel drive vehicle having a pair of left and right front wheels (13*a*) (13*a*) and a pair of left and right rear wheels (9*a*) (9*a*) as driving wheels.

As shown in FIG. 1, the multicylinder engine (1) used in this multipurpose vehicle is a vertical straight-twin-cylinder gasoline engine.

This engine includes two cylinders (#1) (#2). The one on the output side is a first cylinder (#1), and the one on the opposite side of the one on the output side is a second cylinder (#2).

The engine includes an intake air device (14), a fuel supply device (6), an ignition device (16), an exhaust device (not illustrated), and a start device (22).

As shown in FIG. 1, the intake air device (14) includes an intake air port of each of the cylinders (#1) (#2), an intake manifold (18) that distributes intake air to the intake air ports (17) (17), and a throttle valve (19) that adjusts the intake air amount.

The throttle valve (19) is opened and closed by a valve actuator (19*a*) according to an accelerator position of an accelerator pedal (20) detected by an accelerator sensor (AcS). The electronic control device (5) calculates the intake air amount with a throttle opening (SO) detected by a throttle opening sensor (SS) arranged in the valve actuator (19*a*) and intake air pressure detected by an intake air pressure sensor (ApS) arranged on an intake air downstream side of the throttle valve (19).

The electronic control device (5) is an engine ECU. ECU is an abbreviation for an electronic control unit.

As shown in FIG. 1, the fuel supply device (6) includes fuel injectors (In1) (In2) that inject fuel into the cylinders (#1) (#2) from the intake air ports (17) (17) of the respective cylinders (#1) (#2), a delivery pipe (21) that distributes fuel to each fuel injector (In1) (In2), a fuel supply pump (Sp) that supplies fuel to the delivery pipe (21), and a fuel tank (23) that supplies fuel to the fuel supply pump (Sp).

The solenoid valves of the fuel injectors (In1) (In2) are opened and closed for a predetermined time at a predetermined timing by the electronic control device (5) according to the engine rotation speed and the engine load, and a predetermined amount of fuel is injected at a predetermined timing to each cylinder (#1) (#2).

As shown in FIG. 1, the engine rotation speed and the crank angle are calculated by the electronic control device calculating a detection signal from a pulsar gear (24*a*) attached to a flywheel (24) and a pickup coil (25) that detects passage of a protrusion on the periphery of the pulsar gear (24*a*). The pickup coil (25) functions as an engine rotation speed sensor (RS) and a crank angle sensor (CS).

The engine load is calculated by the electronic control device (5) based on the deviation between a target rotation speed predicted from the position of the accelerator pedal (20) and the actual rotation speed detected by the engine rotation speed sensor (RS).

The combustion stroke of each cylinder (#1) (#2) is discriminated by the electronic control device (5) calculating a detection signal from a cam position detection disk (26) attached to a valve camshaft and a cam position sensor (CaS) that detects passage of a protrusion on the periphery of the cam position detection disk (26).

As shown in FIG. 1, the ignition device (16) includes ignition plugs (P1) (P2) of the respective cylinders (#1) (#2) and an ignition coil (27), and with a battery (28) as a power source, ignitions are emitted from the ignition plugs (P1) (P2) at a predetermined timing by the electronic control device (5) according to the engine rotation speed and the engine load.

As shown in FIG. 1, the start device (22) includes a starter (St) that is engaged with a ring gear (24*b*) of the flywheel (24) to perform cranking, and with the battery (28) as a power source, cranking is performed by the starter (St) by a start switch (SSw) being put into the start position, thereby starting the engine. For the start switch (SSw), a key switch (KSw) is used.

As shown in FIG. 1, as described above, this engine-equipped vehicle includes the multicylinder engine (1), the gear transmission (2) that shifts power from the multicylinder engine (1) by a shift operation, the centrifugal clutch (4) arranged in the power transmission path (3) from the multicylinder engine (1) to the gear transmission (2), and the electronic control device (5) that controls the operation of the multicylinder engine (1).

The shift operation position of a transmission lever (29) includes neutral (N), low-speed forward (L), high-speed forward (H), and reverse (R).

This engine-equipped vehicle is configured so that the engine is started with a partial cylinder operation start (S6) shown in FIG. 3 where under control of the electronic control device (5), only some cylinders (#1) are operated and an operation of other cylinders (#2) is stopped.

In this engine-equipped vehicle, the low-torque engine start with the partial cylinder operation start (S6) shown in FIG. 3 makes it difficult for the engine rotation speed to exceed the clutch engagement rotation speed of the centrifugal clutch (4) shown in FIG. 1, and even if the gear transmission (2) is put from the neutral position (N) to the transmission operation position (L) (H) (R) by the shift operation, both the drive side and the driven side of the transmission gear are stopped in the gear transmission (2). Therefore, the gear is engaged smoothly, and gear noise and gear wear in the gear transmission (2) can be prevented.

In this embodiment, the clutch engagement rotation speed of the centrifugal clutch (4) is around 2000 rpm, and the complete explosion rotation speed and the idling rotation speed are around 1000 rpm.

As shown in FIGS. 1 and 2, this engine-equipped vehicle includes an index temperature sensor (IS) that detects, as an index temperature (IT), the engine cooling water temperature, which serves as an index of the engine temperature. The index temperature (IT) may be the engine oil temperature or the engine wall temperature.

As shown in FIG. 3, when the index temperature (IT) detected by the index temperature sensor (IS) is greater than or equal to a predetermined operation selection temperature (ST) (YES in S4), the engine is started with the partial cylinder operation start (S6) under the control of the electronic control device (5). When the index temperature (IT) detected by the index temperature sensor (IS) is less than the predetermined operation selection temperature (ST) (NO in S4), the engine is started with the all-cylinder operation (S12) under the control of the electronic control device (5).

In this engine-equipped vehicle, the engine is started with the partial cylinder operation start (S6) where the fuel supply amount is small at the time of warm start, which saves fuel consumption.

At the time of cold start, the engine is started by high-torque all-cylinder operation (S12), and therefore the success rate of starting is increased.

As shown in FIG. 3, in this engine-equipped vehicle, when an abnormality of the index temperature sensor (IS) is detected (NO in S3) before the engine is started, the engine is started with the all-cylinder operation (S12) under the control of the electronic control device (5).

In this engine-equipped vehicle, at the time of abnormality in the index temperature sensor (IS), where the index temperature (IT) cannot be detected, the engine is started by the high-torque all-cylinder operation (S12), and therefore the engine can be started reliably.

As shown in FIGS. 1 and 2, this engine-equipped vehicle includes an intake air temperature sensor (AS), and as shown in FIG. 3, when an abnormality of the intake air temperature sensor (AS) is detected before the engine is started (NO in S3), the engine is started with the all-cylinder operation (S12) under the control of the electronic control device (5).

In this engine-equipped vehicle, at the time of abnormality of the intake air temperature sensor (AS), where the intake air temperature cannot be detected, the engine is started by the high-torque all-cylinder operation (S12), and therefore the engine can be started reliably.

The intake air temperature sensor (AS) is integrated with the intake air pressure sensor (ApS).

As shown in FIGS. 1 and 2, this engine-equipped vehicle includes the throttle opening sensor (SS), and as shown in FIG. 3, when the throttle opening (SO) detected by the throttle opening sensor (SS) is not fully closed (NO in S5), the engine is started with the all-cylinder operation (S12) under the control of the electronic control device (5).

In this engine-equipped vehicle, at the throttle opening (SO) that is not fully closed where an external load is expected to be applied, the engine is started with the all-cylinder operation (S12) where high torque is obtained, and therefore the engine can be started reliably.

As shown in FIGS. 1 and 2, this engine-equipped vehicle includes the engine rotation speed sensor (RS), and as shown in FIG. 3, when a complete explosion requirement time (t1), in which the engine rotation speed detected by the engine rotation speed sensor (RS) at the engine start with the partial cylinder operation start (S6) reaches the complete explosion rotation speed, exceeds a predetermined complete explosion delay determination time QM (NO in S7), the partial cylinder operation is switched to the all-cylinder operation (S12) under the control of the electronic control device (5).

In this engine-equipped vehicle, when the complete explosion requirement time (t1) is prolonged due to engine start with the partial cylinder operation start (S6), the partial cylinder operation is switched to high-torque (S12), and therefore a reliable engine start and a stable engine operation can be performed.

As shown in FIGS. 1 and 2, in this engine-equipped vehicle, the higher the index temperature (IT) detected by the index temperature sensor (IS) is, the shorter the complete explosion delay determination time QM shown in FIG. 3 is set by the electronic control device (5).

In this engine-equipped vehicle, the complete explosion delay determination time QM is shortened in a medium and high temperature region where complete explosion is predicted to occur in a short time even with the partial cylinder operation start (S6), and at the time of start failure, the engine start is quickly switched to the all-cylinder operation (S12), and therefore the engine start is completed quickly.

In a low temperature region where it is predicted to take time to complete explosion with the partial cylinder operation start, the complete explosion delay determination time QM becomes long, and therefore the failure of the partial cylinder operation start (S6) is unlikely to occur.

As shown in FIGS. 1 and 2, this engine-equipped vehicle includes the engine rotation speed sensor (RS), and when the engine rotation speed detected by the engine rotation speed sensor (RS) reaches the complete explosion rotation speed by an engine start with the partial cylinder operation start (S6), after an elapsed time (t2) after complete explosion has elapsed a predetermined waiting time (Jt2) after complete explosion (after YES in S8), partial cylinder operation is switched to the all-cylinder operation (S12) under the control of the electronic control device (5).

In this engine-equipped vehicle, after complete explosion of the engine start with the partial cylinder operation start (S6), through the predetermined waiting time (Jt2) after complete explosion, the engine rotation is stabilized, and then the operation is switched to the all-cylinder operation (S12). Therefore, at the time of switching to the all-cylinder operation (S12), a rapid increase in the engine rotation speed is suppressed, it is difficult for the engine rotation speed to exceed the clutch engagement rotation speed of the centrifugal clutch (4), and gear noise and gear wear in the gear transmission (2) by the shift operation can be prevented.

As shown in FIGS. 1 and 2, in this engine-equipped vehicle, the higher the index temperature (IT) detected by the index temperature sensor (IS) is, the shorter the waiting time (Jt2) after complete explosion shown in (S8) of FIG. 3 is set by the electronic control device (5).

In this engine-equipped vehicle, the waiting time (Jt2) after complete explosion is shortened in the medium and high temperature region where the engine rotation after the complete explosion is stabilized in a short time even with the engine start with the partial cylinder operation start (S6), and the operation is quickly switched to the all-cylinder operation after the complete explosion, and therefore the switching of operation is completed smoothly.

The waiting time (Jt2) after complete explosion becomes long in the low temperature region where it takes time to stabilize the engine rotation after engine start with the partial cylinder operation start (S6), and after the engine rotation is stabilized, the operation is switched to the all-cylinder operation (S12). Therefore, at the time of switching to the all-cylinder operation (S12), a rapid increase in the engine rotation speed is suppressed, it is difficult for the engine rotation speed to exceed the clutch engagement rotation speed of the centrifugal clutch (4), and gear noise and gear wear in the gear transmission (2) by the shift operation can be prevented.

As shown in FIG. 1, this engine-equipped vehicle includes a gear transmission detection sensor (GS), and when the gear transmission detection sensor (GS) detects a transmission operation from the neutral position (N) by the shift operation during partial cylinder operation, after an elapsed time (t3) after gear transition shown in FIG. 3 has elapsed a predetermined waiting time (Jt3) after gear transition (after YES in S8), partial cylinder operation is switched to the all-cylinder operation (S12) under the control of the electronic control device (5).

In this engine-equipped vehicle, partial cylinder operation is switched to high-torque all-cylinder operation (S12) at the time of transmission operation where an external load is expected to be applied, and therefore engine stall can be prevented.

The switching from the partial cylinder operation to the all-cylinder operation (S12) is performed after the engine rotation is stabilized after the predetermined waiting time (Jt3) after gear transition, and therefore, at the time of switching to the all-cylinder operation (S12), a rapid increase in the engine rotation speed is suppressed, it is difficult for the engine rotation speed to exceed the clutch engagement rotation speed of the centrifugal clutch (4), and gear noise and gear wear in the gear transmission (2) by the shift operation can be prevented.

As shown in FIGS. 1 and 2, in this engine-equipped vehicle, the higher the index temperature (IT) detected by the index temperature sensor (IS) is, the shorter the waiting time (Jt3) after gear transition shown in (S9) of FIG. 3 is set by the electronic control device (5).

In this engine-equipped vehicle, the waiting time (Jt3) after gear transition is shortened in the medium and high temperature region where early stabilization of engine rotation is expected even with the partial cylinder operation, and therefore switching to the all-cylinder operation (S12) is completed quickly after gear transition.

In the low temperature region where it is predicted to take time to stabilize the engine rotation in partial cylinder operation, the waiting time (Jt3) after gear transition becomes long, and after the engine rotation is stabilized by the partial cylinder operation, the operation is switched to the all-cylinder operation (S12). Therefore, at the time of switching to the all-cylinder operation (S12), a rapid increase in the engine rotation speed is suppressed, it is difficult for the engine rotation speed to exceed the clutch engagement rotation speed of the centrifugal clutch (4), and gear noise and gear wear in the gear transmission (2) by the shift operation can be prevented.

As shown in FIG. 1, the fuel supply device (6) that individually supplies fuel to each cylinder (#1) (#2) is included. As shown in FIG. 3, in this engine-equipped vehicle, when partial cylinder operation is switched to the all-cylinder operation (S12), the fuel supply amount to the cylinder (#2) that has newly started the operation gradually increases from the start of supply over a predetermined gradually increasing supply period under the control of the electronic control device (5).

In this engine-equipped vehicle, the engine torque gradually increases after switching to the all-cylinder operation (S12), and therefore it is possible to prevent an impact due to a rapid increase in torque at the time of switching the operations.

As shown in FIG. 1, this engine-equipped vehicle includes the ignition plugs (P1) (P2) for the respective cylinders (#1) (#2). As shown in FIG. 3, when the partial cylinder operation is switched to the all-cylinder operation (S12), the ignition timing to the cylinder (#2) that has newly started the operation is progressive from the ignition start over a predetermined progressive ignition period under the control of the electronic control device (5).

In this engine-equipped vehicle, the engine torque gradually increases after switching to the all-cylinder operation (S12), and therefore it is possible to prevent an impact due to a rapid increase in torque at the time of switching the operations.

This engine-equipped vehicle is a multipurpose vehicle.

Multipurpose vehicles include multipurpose four-wheel-drive vehicles that are exclusively for off-road use and are used in farms, ranches, parks, and the like.

Many multipurpose vehicles have the flywheel (24) that is light in weight, and the engine rotation tends to rapidly increase at the time of engine start.

The present invention becomes an effective device for preventing gear noise and gear wear for a multipurpose vehicle in which the engine rotation tends to rapidly increase at the time of engine start.

The procedure of the control by the electronic control device will be described based on the flowchart of FIG. 3.

When the start switch (SSw) is put into the start position in step (S2) while the engine is stopped in step (S1), it is determined in step (S3) whether or not there is an abnormality in the index temperature sensor (IS) and the intake air temperature sensor (AS). In the case of a signal abnormality due to disconnection or failure, it is determined that there is an abnormality, and the engine is started with the all-cylinder operation in step (S12) without transitioning to the partial cylinder operation start in step (S6).

If there is no abnormality in the index temperature sensor (IS) and the intake air temperature sensor (AS) in step (S3), it is determined in step (S4) whether or not the index temperature (IT) is greater than or equal to the operation selection temperature (ST). If the determination is denied, that is, if the index temperature (IT) is less than the operation selection temperature (ST), the engine is started with the all-cylinder operation in step (S12) without transitioning to the partial cylinder operation start in step (S6).

If the determination is affirmed in step (S4), that is, if the index temperature (IT) is greater than or equal to the operation selection temperature (ST), it is determined in step (S5) whether or not the throttle opening (SO) is fully closed. If the determination is denied, that is, if the throttle opening (SO) is not fully closed, the engine is started with the all-cylinder operation in step (S12) without transitioning to the partial cylinder operation start in step (S6).

If the determination is affirmed in step (S5), that is, if the throttle opening (SO) is fully closed, the engine is started with the partial cylinder operation start in step (S6), and it is determined in step (S7) whether or not the complete explosion requirement time (t1) is within the complete explosion delay determination time (Jt1). If the determination is denied, that is, if the complete explosion requirement time (t1) exceeds the complete explosion delay determination time (Jt1), partial cylinder operation is switched to the all-cylinder operation in step (S12).

If the determination is affirmed in step (S7), that is, if the complete explosion requirement time (t1) is less than or equal to the complete explosion delay determination time (Jt1), it is determined in step (S8) whether or not the elapsed time (t2) after complete explosion is greater than or equal to the waiting time (Jt2) after complete explosion. If the determination is affirmed, that is, if the elapsed time (t2) after complete explosion is greater than or equal to the waiting time (Jt2) after complete explosion, partial cylinder operation is switched to the all-cylinder operation in step (S12).

If the determination is denied in step (S8), that is, if the elapsed time (t2) after complete explosion is less than the waiting time (Jt2) after complete explosion, it is determined in step (S9) whether or not the elapsed time (t3) after gear transition is greater than or equal to the waiting time (Jt3) after gear transition. If the determination is affirmed, that is, if the elapsed time (t3) after gear transition is greater than or equal to the waiting time (Jt3) after gear transition, partial cylinder operation is switched to the all-cylinder operation in step (S12).

If the determination is denied in step (S9), that is, if the elapsed time (t3) after gear transition is less than the waiting time (Jt3) after gear transition, it is determined in step (S10) whether or not a throttle operation has been performed. If the determination is affirmed, that is, if the throttle operation has been performed, partial cylinder operation is switched to the all-cylinder operation in step (S12).

If the determination is denied in step (S10), that is, if the throttle operation has not been performed, partial cylinder operation is continued in step (S11) and the process returns to step (S8).

In the case of engine start with the all-cylinder operation in step (S12), if it is determined that engine stall has occurred in step (S13) and it is determined that a restart operation has been performed in step (S14), specifically, the start switch (SSw) has been put again, the engine is restarted with the all-cylinder operation start in step (S15) without transitioning to the partial cylinder operation start in step (S6).

If the determination of engine stall is denied in step (S13), or if the determination of engine stall is affirmed in step (S13) but the determination of restart is denied in step (S14), the control ends.

What is claimed is:

1. An engine-equipped vehicle comprising: a two-cylinder engine; a gear transmission that shifts power from the two-cylinder engine by a shift operation; a centrifugal clutch arranged in a power transmission path from the two-cylinder engine to the gear transmission; and an electronic control device that controls an operation of the two-cylinder engine, wherein the engine-equipped vehicle is configured so that the engine is started with a partial cylinder operation start where under control of the electronic control device, only a first cylinder is operated and an operation of a second cylinder is stopped, and the centrifugal clutch is arranged at an end of a crankshaft on a first cylinder side, and a ring gear is arranged at an end of the crankshaft on a second cylinder side, the ring gear becoming engaged with a starter when the engine is started, so that with the partial cylinder operation start, a rotation torque of the first cylinder and the rotation torque of the ring gear are applied to opposite sides of the second cylinder.

2. The engine-equipped vehicle according to claim 1, comprising:

an index temperature sensor that detects an index temperature of any of an engine cooling water temperature, an engine oil temperature, and an engine wall temperature, which become indices of engine temperatures, wherein when an index temperature detected by the index temperature sensor is greater than or equal to a predetermined operation selection temperature, the engine is started with a partial cylinder operation start under control of the electronic control device, and when an index temperature detected by the index temperature sensor is less than the predetermined operation selection temperature, the engine is started with an all-cylinder operation under control of the electronic control device.

3. The engine-equipped vehicle according to claim 2, wherein when an abnormality of the index temperature sensor is detected before the engine is started, the engine is started with an all-cylinder operation under control of the electronic control device.

4. The engine-equipped vehicle according to claim 1, comprising:

an intake air temperature sensor, wherein when an abnormality of the intake air temperature sensor is detected before the engine is started, the engine is started with an all-cylinder operation under control of the electronic control device.

5. The engine-equipped vehicle according to claim 1, comprising:

a throttle opening sensor, wherein when a throttle opening detected by the throttle opening sensor is not fully closed, the engine is started with an all-cylinder operation under control of the electronic control device.

6. The engine-equipped vehicle according to claim 1, comprising:

an engine rotation speed sensor, wherein when a complete explosion requirement time, in which an engine rotation speed detected by the engine rotation speed sensor at engine start with a partial cylinder operation start reaches a complete explosion rotation speed, exceeds a predetermined complete explosion delay determination time, a partial cylinder operation is switched to an all-cylinder operation under control of the electronic control device, so that upon the partial cylinder operation start undergoing a transition to the all-cylinder operation, where a connection to the centrifugal clutch causes a rotational load to be applied by the centrifugal clutch, the rotational load of the centrifugal clutch is received by the first cylinder, the first cylinder operating in the partial cylinder operation prior to the transition.

7. The engine-equipped vehicle according to claim 6, comprising:

an index temperature sensor that detects an index temperature of any of an engine cooling water temperature, an engine oil temperature, and an engine wall temperature, which become indices of engine temperatures, wherein the higher an index temperature detected by the index temperature sensor is, the shorter a complete explosion delay determination time is set by the electronic control device.

8. The engine-equipped vehicle according to claim 1, comprising:

an engine rotation speed sensor, wherein when an engine rotation speed detected by the engine rotation speed sensor reaches a complete explosion rotation speed by an engine start with a partial cylinder operation start, after an elapsed time after complete explosion reaches a predetermined waiting time after complete explosion, a partial cylinder operation is switched to an all-cylinder operation under control of the electronic control device, so that upon the partial cylinder operation start undergoing a transition to the all-cylinder operation, where a connection to the centrifugal clutch causes a rotational load to be applied by the centrifugal clutch, the rotational load of the centrifugal clutch is received by the first cylinder, the first cylinder operating in the partial cylinder operation prior to the transition.

9. The engine-equipped vehicle according to claim 8, comprising:

an index temperature sensor that detects an index temperature of any of an engine cooling water temperature, an engine oil temperature, and an engine wall temperature, which become indices of engine temperatures, wherein the higher an index temperature detected by the index temperature sensor is, the shorter a waiting time after complete explosion is set by the electronic control device.

10. The engine-equipped vehicle according to claim 1, comprising:

a gear transmission detection sensor, wherein when the gear transmission detection sensor detects a transmission operation from a neutral position by a shift operation during a partial cylinder operation, after an elapsed time after gear transition reaches a predetermined waiting time after gear transition, a partial cylinder operation is switched to an all-cylinder operation under control of the electronic control device, so that upon the partial cylinder operation start undergoing a transition to the all-cylinder operation, where a connection to the centrifugal clutch causes a rotational load to be applied by the centrifugal clutch, the rotational load of the centrifugal clutch is received by the first cylinder, the first cylinder operating in the partial cylinder operation prior to the transition.

11. The engine-equipped vehicle according to claim 10, comprising:

an index temperature sensor that detects an index temperature of any of an engine cooling water temperature, an engine oil temperature, and an engine wall temperature, which become indices of engine temperatures, wherein the higher an index temperature detected by the index temperature sensor is, the shorter a waiting time after gear transition is set by the electronic control device.

12. The engine-equipped vehicle according to claim 1, comprising a fuel supply device that individually supplies fuel to each cylinder, wherein when a partial cylinder operation is switched to an all-cylinder operation, a fuel supply amount to a cylinder that has newly started an operation gradually increases from start of supply over a predetermined gradually increasing supply period under control of the electronic control device.

13. The engine-equipped vehicle according to claim 1, comprising:

ignition plugs for each cylinder, wherein when a partial cylinder operation is switched to an all-cylinder operation, ignition timing to a cylinder that has newly started an operation is progressive from ignition start over a predetermined progressive ignition period under control of the electronic control device.

14. The engine-equipped vehicle according to claim 1, wherein the engine-equipped vehicle is a multipurpose vehicle.

15. The engine-equipped vehicle according to claim 2, comprising:

an intake air temperature sensor, wherein when an abnormality of the intake air temperature sensor is detected before the engine is started, the engine is started with an all-cylinder operation under control of the electronic control device.

16. The engine-equipped vehicle according to claim 3, comprising:

an intake air temperature sensor, wherein when an abnormality of the intake air temperature sensor is detected before the engine is started, the engine is started with an all-cylinder operation under control of the electronic control device.

17. The engine-equipped vehicle according to claim 2, comprising:

a throttle opening sensor, wherein when a throttle opening detected by the throttle opening sensor is not fully closed, the engine is started with an all-cylinder operation under control of the electronic control device.

18. The engine-equipped vehicle according to claim 3, comprising:

a throttle opening sensor, wherein when a throttle opening detected by the throttle opening sensor is not fully closed, the engine is started with an all-cylinder operation under control of the electronic control device.

19. The engine-equipped vehicle according to claim 2, comprising:

an engine rotation speed sensor, wherein when a complete explosion requirement time, in which an engine rotation speed detected by the engine rotation speed sensor at engine start with a partial cylinder operation start reaches a complete explosion rotation speed, exceeds a predetermined complete explosion delay determination time, a partial cylinder operation is switched to an all-cylinder operation under control of the electronic control device.

20. The engine-equipped vehicle according to claim 3, comprising:

an engine rotation speed sensor, wherein when a complete explosion requirement time, in which an engine rotation speed detected by the engine rotation speed sensor at engine start with a partial cylinder operation start reaches a complete explosion rotation speed, exceeds a predetermined complete explosion delay determination time, a partial cylinder operation is switched to an all-cylinder operation under control of the electronic control device.

21. The engine-equipped vehicle according to claim 1, wherein when engine stall has occurred with an all-cylinder operation, the engine is restarted with an all-cylinder operation start under control of the electronic control device when the engine is restarted.

* * * * *